Nov. 2, 1971    M. S. NEWKIRK    3,616,779
GAS FUELED INTERNAL COMBUSTION ENGINE
Filed June 22, 1970
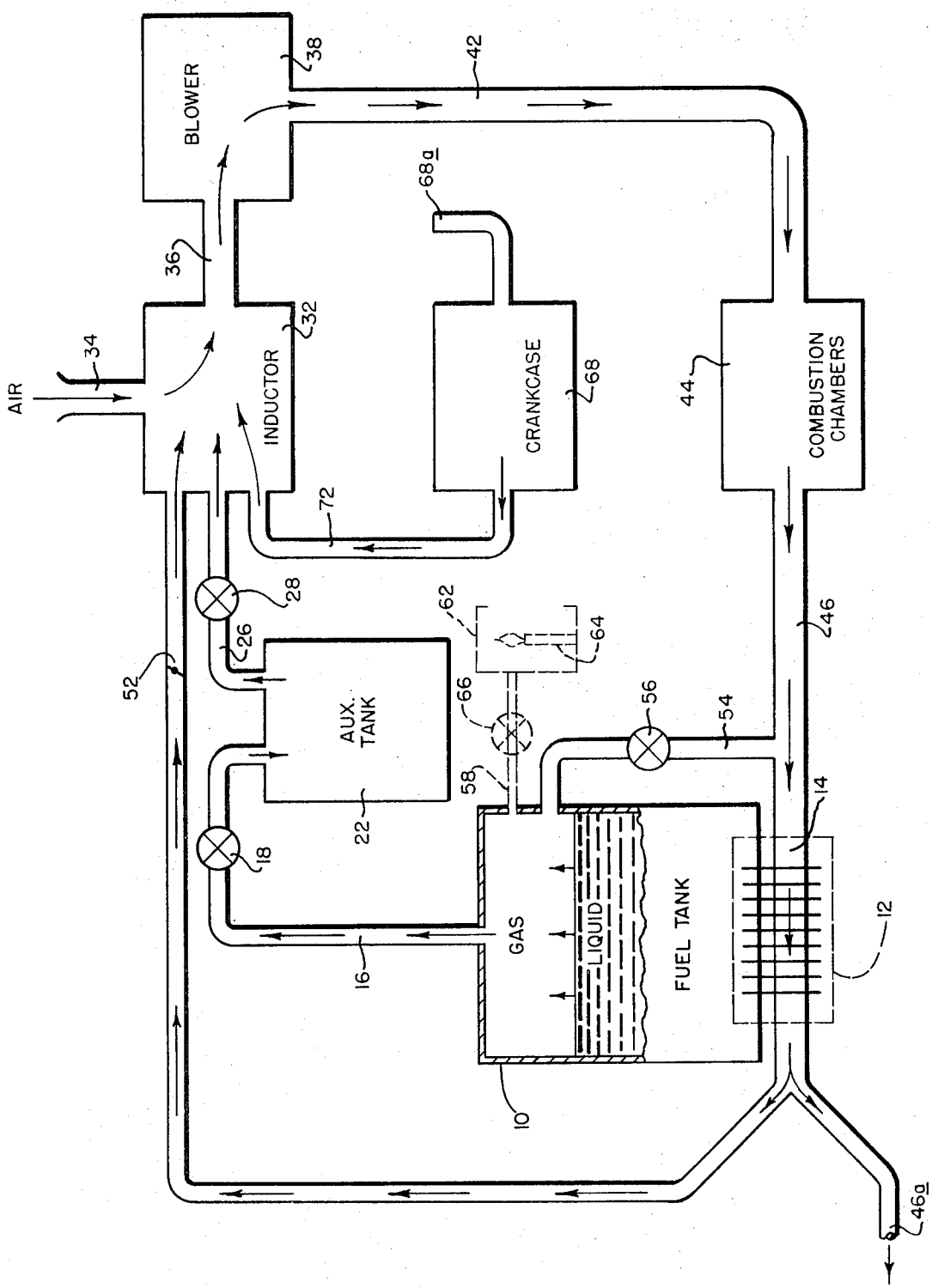
MARC S. NEWKIRK
*Inventor*
By CESARI & McKENNA
*Attorneys*

3,616,779
GAS FUELED INTERNAL COMBUSTION ENGINE
Marc S. Newkirk, Lynnfield, Mass., assignor to American Environmental Research Corporation, Malden, Mass.
Filed June 22, 1970, Ser. No. 47,990
Int. Cl. F02m 21/00; F02f 9/00
U.S. Cl. 123—27 GE                                      2 Claims

ABSTRACT OF THE DISCLOSURE

An internal comustion engine is powered by a gaseous fuel such as hydrogen. The gas is stored in liquid form in an insulated tank. A heat exchanger associated with the tank converts the liquid to a gas at a controlled rate dependent upon the demands of the engine. The gas is then fed to the engine inductor. In the inductor, the gaseous fuel is mixed with air and then pumped under relatively high pressure into the engine combustion chambers to achieve a high compression ratio.

High energy steam exhausting from the combustion chambers is circulated through the heat exchanger where it gives up some of its heat and thence back to the engine combustion chambers where it functions as a cooling and working medium. Any flammable gas which finds it way into the crankcase is scavenged therefrom in order to minimize the likelihood of explosions at that location.

BACKGROUND OF THE INVENTION

This invention relates to an internal combustion engine which runs on hydrogen or other gaseous fuel. It relates more particularly to an engine of this type which is safe and relatively economical to run and which emits a minimum amount of pollutants.

Internal combustion engines which burn hydrogen are not new. Pat. No. 2,602,289 discloses a vehicle which carries hydrogen as liquid in a tank. There, gaseous hydrogen is drawn off from the tank and used to drive an internal combustion engine. Another such hydrogen fueled engine is disclosed in Pat. 3,101,592.

Invariably, however, these prior engines suffer one or another drawback which limits their practical application as a motive source for automobiles and other vehicles in everyday use. More particularly, in some conventional engines of this type, there is leakage of unmixed hydrogen past the piston rings into the crankcase. This hydrogen then mixes with incoming air on the compression stroke, creating a combustible mixture in the crankcase which may be ignited by flames penetrating past the rings. This creates an undesirable and sometimes dangerous situation.

Prior hydrogen fueled engines also tend to be relatively inefficient due to various factors such as the inability to store hydrogen in liquid form for any length of time, excessive heating of the engine parts and inefficient and irregular combustion. As a result, hydrogen fueled internal combustion engines have not reached their full potential. Yet, an engine such as this is certainly a highly desirable objective in view of the greatly reduced amount of pollutants emitted during the burning of the hydrogen fuel.

SUMMARY OF THE INVENTION

Accordingly, this invention aims to provide a gaseous fueled internal combustion engine which emits a minimum amount of pollutants to the atmosphere.

Another object of the invention is to provide a gaseous fueled internal combustion engine which is safe to operate.

A further object of the invention is to provide a gaseous fueled internal combustion engine which runs relatively efficiently.

Yet another object of the invention is to provide an improved gaseous fueled internal combustion engine which is relatively easy to make and maintain.

A further object of the invention is to provide an internal combustion engine which burns a gaseous fuel such as hydrogen and which is relatively economical to operate.

A further object of the invention is to provide an internal combustion engine which produces the gaseous fuel in accordance with the engine demand.

Other objects will in part be obvious and will in part appear hereafter.

The invention accordingly comprises the features of construction, combination of elements and arrangement of parts which will be exemplified in the construction hereinafter set forth, and the scope of the invention will be indicated in the claims.

In general, my engine runs on a gaseous fuel which is stored in liquid form in an insulated tank. For purposes of illustration, we will describe an engine which burns hydrogen because the principal combustion product of hydrogen is water which does not tend to pollute the atmosphere. Furthermore, hydrogen contains a relatively large amount of energy per unit weight as compared with other gases.

There is a heat exchanger between the tank and the engine's exhaust system so that the liquid hydrogen is heated to provide hydrogen gas in proportion to the engine's fuel demand. The hydrogen gas is then fed to a carburetor, blower, fuel injectoror other conventional inductor where it is mixed with air in substantially stoichiometric proportion, forming a very highly combustible mixture which is then fed to the engne combustion chambers.

Preferably, a blower is included in the line between the inductor and the combustion chambers, so that the fuel-air mixture enters the chambers at a relatively high pressure during the normal operation of the unit. This, in effect, gives the engine a relatively high compression ratio on the order of 25:1 so that its efficiency is maximized. However, at cranking speeds, blower efficiency is low enough so as to provide more normal compression ratios, perhaps on the order of 10:1. This lower pressure is maintained until the engine gets up to speeds where the blower becomes efficient.

The engine has an exhaust manifold which extends through the heat exchanger so that the heat from the hot exhaust gases converts liquid hydrogen to gaseous hydrogen as described previously. On the other hand, the principal exhaust product, steam, upon giving up some of its heat to the hydrogen, loses some of its thermal energy. This low energy steam performs additional functions in that it is recirculated into the inductor where it is mixed with the incoming hydrogen gas and air and forms part of the combustible mixture injected into the combustion chamber. Thus, this low energy steam serves both as a cooling medium for the engine and an expansion medium during combustion. In other words, the steam which is relatively cool at this point is injected into the engine where it helps to cool the engine parts such as the cylinder walls, pistons and valves so that the fuel-air mixture in the combustion chambers is ignited in the proper fashion by timed sparks as opposed to being detonated by the hot engine parts during the compression stroke. This so-called auto-ignition is a major cause of engine "knock."

In addition, the water vapor injected into the engine combustion chambers is heated when the combustible mixture is ignited. The vapor reverts to high energy steam and expands along with the other gases in the combustion chamber. Consequently, the vapor is a true working medium which helps to maximize combustion efficiency and increase engine output power.

In a preferred embodiment of the engine, provision is made for continually scavenging the crankcase of hydrogen that may find its way to that space. That is, sometimes mixed or unmixed hydrogen from the combustion chambers escapes past the piston rings into the crankcase where it further mixes with air, creating a very highly combustible mixture. Unless steps are taken to prevent it, this mixture can be ignited by flames escaping past the piston rings and cause an unwanted and dangerous explosion in that space. In the present engine, the crankcase is continuously flushed with air so that the hydrogen concentration is never sufficient to create a combustible mixture there.

As an alternative, the cold incoming hydrogen gas from the heat exchanger is diverted through the crankcase on the way to the inductor. In this way, the hydrogen flushes out any combustible fuel-air mixture escaping into the crankcase or enriches it to the extent that it is no longer a flammable mixture. The cold hydrogen flowing through the crankcase also cools the engine parts there and further reduces the emanation of exhaust vapors from the crankcase into the atmosphere.

The present engine design could operate on a wide range of gaseous fuels. Also, the design is relatively efficient, having a relatively high power-to-weight ratio and, therefore, could be economical to operate.

BREIF DESCRIPTION OF THE DRAWING

For a fuller understanding of the nature and objects of the invention, reference should be had to the following detailed description taken in conjunction with the accompanying drawing which is ab lock diagram of an internal combustion engine embodying the principles of my invention.

DESCRIPTION OF THE PREFERRED EMBODIMENT

Turning now to the drawing, hydrogen fuel is stored as a liquid in an insulated or double-walled tank 10. A heat exchanger 12 intimately associated with the bottom wall of tank 10 includes a hot tubular heat exchanger element 14 which is actually part of the engine exhaust system and will be described later. The hot engine exhaust products passing through element 14 give up some of their heat to the liquid hydrogen in tank 10 so that a supply of hydrogen gas is maintained at the top of the tank as indicated in the drawing.

Thus, the rate of evaporation of hydrogen is determined directly by the amount of exhaust products passing through the heat exchanger. Bearing in mind that the amount of exhaust from the engine is dependent upon the power output thereof, it becomes evident that the rate of evaporation of hydrogen in the tank is proportional to the engine's power output. In other words, as engine output power is increased, the engine generates more exhaust products which heat the liquid fuel supply to a greater extent so that more gaseous hydrogen is generated in the tank to meet the increased fuel demands of the engine. Conversely, as the power requirements of the engine drop, less gaseous hydrogen is generated consistent with the reduced fuel requirements of the engine.

A fuel line 16 including a fuel line pressure regulator 18 extends from the top of the tank 10 to an auxiliary gas storage tank 22. An appreciable volume of gas is maintained in tank 22 so that it will be available to meet the instantaneous demands of the engine shown generally at 24.

Another fuel line 26 conducts gas from storage tank 22 by way of a throttle 28 directly to the engine inductor 32. Trottle 28 is actually an adjustable pressure regulator which controls the rate at which the gaseous hydrogen is fed to the inductor.

Inside inductor 32, the hydrogen gas is thoroughly mixed with outside air drawn into the inductor through an air intake manifold 34 containing the usual filters, etc. Also introduced into this mixture are some of the exhaust products from the engine as will be described later. In any event, a very highly combustiblef uel-air mixture is formed in inductor 32 which is then fed by way of a line 36 to a blower 38. The outlet side of blower 38 is, turn, connected by way of a pipe 42 to the engine combustion chambers 44.

Blower 38 is included because it is desirable that the fuel-air mixture be fed to combustion chambers 44 under relatively high pressure during normal operation of the engine to increase the engine's compression ratio and thereby increase its overall efficiency. Preferably, the blower 38 should deliver the combustible mixture to the chambers 44 at a sufficiently high pressure that compression ratios on the order of 25:1 are obtained.

Operation of the engine at such high compression ratios means that it is more difficult to start initially. Accordingly, the blower 38 is selected so that at engine cranking speeds, the blower effieciency is relatively low so as to provide a more normal compression ratio, e.g., on the order of 10:1. A straight vane or Rootes-type blower is satisfactory. Blower 38 also performs an additional function in that it very thoroughly mixes the gases being fed to the combustion chambers assuring that a uniform highly combustible mixture is injected into the chambers.

An alternative technique for obtaining the lower compression ratio when starting the engine involves installing a fluid bypass line around blower 38. This bypass line contains a valve which is controlled by the speed of the engine and remains open so long as the engine is operating below a selected speed. The valve itself may be quite conventional and can be controlled by any suitable pickoff point which reflects engine r.p.m., i.e. the crankshaft. When the valve is open, the pressure of the mixture fed to the combustion chambers 44 is sufficiently low as to yield the requisite low compression ratio for easy starting. Also, to achieve the lower ratio at cranking speeds, blower 38 may itself be controlled by any well-known switching means so that it is operating only when the engine speed exceeds a selected value.

The products of combustion exit combustion chambers 44 through an exhaust manifold 46. Since, in the illustrated engine, the fuel is hydrogen, the principal combustion product is steam. Manifold 46 connects with the hot heat exchange element 14 mentioned previously so that the hot combustion products pass through heat exchanger 12.

These exhaust products are cooled by the liquid hydrogen in tank 10 to an extent that the high energy steam therein reverts to low energy steam. The low energy steam is then fed back to the engine inductor 32 by way of a line 48 where it is mixed with the incoming gaseous hydrogen and air. Thus, this water vapor or low energy steam is injected into the combustion chambers 44 along with the combustible fuel-air mixture. Consequently, when the combustible mixture is ignited in chambers 44, the injected water vapor reverts to high energy steam and expands along with the other gases, thereby increasing the total gas pressure in the combustion chambers 44. Thus, by using the engine's own combustion products, the overall engine power and efficiency are increased.

In addition, the water vapor injected into chambers 44 is relatively cool. Consequently, it helps to cool the various engine parts such as the cylinders, piston rings, etc. As a result, there is less tendency for the incoming fuel-air mixture to detonate during the cylinder compression strokes. Rather, the flammable mixture in each cylinder is ignited at the proper time by a sparkplug associated with that cylinder. This feature also helps to increase engine efficiency and minimize engine "knock."

Those combustion products which do reach the exhaust pipe end 46a are relatively cool and contain a minimum amount of harmful pollutants because, as mentioned previously, the dominant combustion product is water. Thus, even a poorly tuned engine is relatively pollution-free. Further, the burning of the hydrogen does not develop the engine deposits presently found in today's internal combustion engines.

The amount of low-energy steam recirculated through line 48 to inductor 32 can be suitably set by conventional means such as a butterfly valve 52 or simply a constriction in line 48.

Preferably, provision is made in the present engine for preventing the buildup of an excessive gas pressure in tank 10. More particularly, a hydrogen gas vent line 54 leads from the top of tank 10 to exhaust manifold 46. Line 54 contains a check valve 56 which opens to release gas from tank 10 whenever the gas pressure exceeds a predetermined amount. The gas is released to manifold 46 where it mixes with the combustion products from chambers 44 and is either recirculated as described above or exhausted to the atmosphere through the exhaust pipe end 46a. The check valve 56 remains closed whenever the pressure in the exhaust manifold 46 exceeds that in the tank so that the engine exhaust products cannot enter tank 10.

As an alternative, the excessive gas pressure in tank 10 can be vented by way of pipe 58 to a station 62 containing a pilot light 64 which is lit whenever the car is being used. These elements are indicated in dotted lines in the drawing figure. Line 58 contains a check valve 66 which opens to release gas from tank 10 whenever the gas pressure exceeds the selected value. As soon as the gas reaches station 62, it is ignited by pilot light 64 and burned in a controlled manner. Of course, when station 62 is used, the vent line 54 may be omitted.

Also, in lieu of a pilot light, station 62 may contain a catalyst bed. The catalyst should be of the type which is able to convert the hydrogen to a form which does not pollute the atmosphere. Examples of such catalysts are finely divided platinum or palladium deposited on an inert material such as aluminum oxide granules.

It is possible that a certain amount of the fuel-air mixture in combustion chambers 44 may find its way past the piston rings and into the engine crankcase 68. The buildup of this highly combustible mixture in the crankcase is very undesirable and quite dangerous. This is because the flame from the combustion chambers may escape past the piston rings and explode the mixture. To minimize the chances of this occurring, crankcase 68 is continually scavenged so that there is minimal buildup of a flammable mixture there.

More particularly, crankcase 68 is connected by way of a pipe 72 to the inductor 32. When the engine is operating, a vacuum is drawn in line 72 so that air from the outside is drawn into the crankcase through its vent 68a. This fresh air continually flushes any combustible mixture from the crankcase so there is little chance of an explosion occurring there.

An alternative technique for drawing a vacuum in the crankcase is to connect the line 72 directly to a conventional vacuum pump. Also, instead of flushing the crankcase with air as described above, the relatively cold hydrogen gas in line 16 can be diverted through the crankcase prior to entering the storage tank 22 so that a hydrogen atmosphere is maintained in the crankcase. This continual flow of relatively cold hydrogen gas dilutes and flushes away any combustible fuel-air mixture which may be accumulating in the crankcase and enriches the atmosphere therein to the extent that it is well below the minimum flammable fuel-air mixture, i.e. on the order of 25% air by volume. Thus, even if a flame should escape past the piston rings into the crankcase, it will be unable to ignite the atmosphere therein.

In addition, the relatively cold hydrogen gas flowing through the crankcase cools the engine parts therein and so minimizes the amount of vaporous pollutants emanating from that location.

It is apparent from the foregoing that the engine described herein runs efficiently on hydrogen or other gaseous fuels. In the case of hydrogen, it takes advantage of the fact that the gas has a high autoignition temperature and so it can operate with a relatively high compression ratio. Also, hydrogen has a high energy-to-weight ratio. Further, the fuel is stored in liquid form so that it occupies a minimum amount of space. Moreover, the fuel is not just a combustion source. Rather, it is used to cool the various engine parts and also to recover engine exhaust products which are then re-ejected into the engine combustion chambers as an expansion medium. Thus, the hydrogen fuel helps to maximize the efficiency of the engine and minimize the amount of undesirable pollutants issuing from the engine.

Even more, however, the gaseous fuel may also serve to flush out the engine crankcase and minimize the buildup of an explosive mixture there. Still, with all these advantages, the construction, maintenance and operating costs of the subject engine could be reasonably low.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:

1. In an internal combustion engine having a fuel supply, a crankcase, combustion chambers and means for injecting air into the combustion chambers, the improvement comprising means for circulating cold, gaseous fuel from the supply through the crankcase prior to its introduction into the injecting means so as to minimize the presence of air in the crankcase that would tend to create a flamable atmosphere therein.

2. In an internal combustion engine having a fuel supply, a crankcase, combustion chambers and means for injecting air into the combustion chambers, the improvement comprising flushing means for drawing a nonflammable gas through the crankcase to dilute and purge an explosive atmosphere therein, said flushing means including a conduit for conducting cold gaseous fuel from the supply to the crankcase prior to its delivery to the injecting means so that the fuel flushes out air in the crankcase and thereby prevents the buildup of an explosive mixture therein.

References Cited

UNITED STATES PATENTS

| | | | |
|---|---|---|---|
| 1,818,240 | 8/1931 | Morrell | 123—1 A |
| 2,298,214 | 10/1942 | Jones | 123—122 E |
| 2,602,289 | 7/1952 | Anxionnaz et al. | 123—121 UX |
| 2,613,658 | 10/1952 | Coffey | 123—120 X |
| 2,715,395 | 8/1955 | Finvold | 123—119 A |
| 2,781,752 | 2/1957 | Van den Bussche | 123—120 |
| 2,937,634 | 5/1960 | Kelseaux et al. | 123—119 E |
| 2,977,940 | 4/1961 | Theriault | 123—119 A |
| 3,306,033 | 2/1967 | Cornelius | 123—119 B |
| 3,306,273 | 2/1967 | Dolphin | 123—120 |
| 2,580,572 | 1/1952 | McMillan | 123—32 |
| 2,786,457 | 3/1957 | Mickley | 123—41.86 |

LAURENCE M. GOODRIDGE, Primary Examiner

U.S. Cl. X.R.

123—120, 136, 41.86